APPARATUS FOR REDUCING MAGNETIC TAPE INTER-RECORD GAP

Filed June 28, 1963 3 Sheets-Sheet 1

INVENTORS
WILLIAM B. OTTO
BARRY E. CUNNINGHAM
BY Bernard M. Goldman
ATTORNEY

APPARATUS FOR REDUCING MAGNETIC TAPE INTER-RECORD GAP

Filed June 28, 1963

APPARATUS FOR REDUCING MAGNETIC TAPE INTER-RECORD GAP

Filed June 28, 1963 3 Sheets-Sheet 3

United States Patent Office 3,325,796

Patented June 13, 1967

3,325,796

APPARATUS FOR REDUCING MAGNETIC TAPE INTER-RECORD GAP

William B. Otto, Wappingers Falls, and Barry E. Cunningham, Poughkeepsie, N.Y., assignors to International Business Machines Corporation, New York, N.Y., a corporation of New York Filed June 28, 1963, Ser. No. 291,458
10 Claims. (Cl. 340—174.1)

This invention relates to the coordination of reading and writing tape data blocks with a high speed program-operated computer. In particular, this invention relates to inter-record gap size control in relation to the time of a reading or writing instruction for a tape drive. Consideration is given to the statistical likelihood that a next read or write instruction will be the same as a prior instruction, and that it will occur within a short range of time after execution of a prior reading or writing instruction on the same tape drive. Under these particular statistical conditions, this invention obtains a minimum access time with a fixed minimum size interrecord gap when writing on tape, and can operate with such interrecord gap size when reading the tape.

Prior tape systems generally suffer substantial interrecord gap size variation as a function of when the next write instruction occurs after completing the prior data block. Prior systems generally dropped the capstan actuation signal (called the tape Move or tape Go signal) as soon as the prior instruction was completed at the end of a block read or written on tape, and the Go signal was brought up whenever the next instruction occurred. In such case, the time the tape Go signal is down (between the time of the end of the prior block and the time of a new instruction) affects the mechanical characteristics of the capstan actuator and capstan assembly. Its mechanical inertia prevents it from responding as quickly as the electrical signal can be controlled. The Go signal can be down a period of time (such as 0.3 millisecond) without significantly affecting the mechanical inertia, but thereafter the tape beings slowing down with a brake being soon applied to the tape movement. Also undesirable vibratory conditions can sometimes occur as a function of the period that the Go signal is down. If a new instruction occurred during the deceleration period, the tape would begin accelerating from any of various velocity rates, depending upon how far the deceleration had gone. The new instruction starts a standard write delay, during which acceleration of the tape is obtained and the remaining part of the interrecord gap is generated, immediately after which writing starts for the next block (or reading is enabled for the next block). As a result the size of the interrecord gap can vary considerably according to the time of the next instruction; and the interrecord gap variation could be as much as 50% greater than its desired minimum size. Under such circumstances it was essential to design the write delay to provide under worst conditions at least a minimum size interrecord gap; so that when reading tape, there was assurance that the tape had reached nominal velocity prior to the read head reaching the next block. If the interrecord gap is too small, the tape will not reach sufficient velocity for reading the next block, and errors will result.

While the data capacity of a reel of tape can be reduced considerably when interrecord gap size is larger than necessary, this is not generally the major consideration with the computer system. The major consideration is the length of the access time for the data heads to go from the end of one block of data to the beginning of the next block. Thus, access time is the time needed for the data heads to scan the interrecord gap with the tape moving at nominal velocity.

A 50% increase in gap size might means as much as an additional two or three milliseconds of access time. While this may appear small, it can cumulatively add up to minutes and hours of expensive system time, when it is realized that a single reel of tape may have as many as 30,000 interrecord gaps separating respective data blocks.

Accordingly, it is a primary object of this invention to obtain and operate with a fixed minimum size interrecord gap between adjacent data blocks written on tape under practical computer operation conditions.

This invention involves automatically beginning the next read or write delay immediately after completing the reading or writing of the prior data block; and therefore the invention maintains the capstan Go signal actuated after a read or write instruction is completed. This automatic read or write delay period is terminated however if a new instruction does not occur within a predesignated period of time after completion of the prior instruction. The predesignated period of time can be as long as the automatic write delay time without suffering any variation from the minimum interrecord gap size, as long as the next instruction occurs within the predesignated time. However, if the instruction does not come within that time, a larger than minimum size interrecord gap results.

The foregoing and other objects, features and advantages of the invention will be apparent from the following more particular description of the preferred embodiment of the invention, as illustrated in the accompanying drawings.

Computer systems can operate electronically in a relatively few microseconds to transfer data, but generally mechanical input-output systems require milliseconds to respond initially. Consequently it is highly desirable for a mechanical *I/O* system such as a tape unit, to be able to initially respond with a data operation as quickly as possible. Once the initial mechanical inertia has been overcome, the data output rate from tape can often match the computer rate as long as a block is being read or written. But even though tape is moving at full speed, time is lost in moving across the separation between data blocks known as the interrecord gap, which must be provided if the computer should ever want to stop the tape after writing or reading any block, and not immediately write or read the next block. Thus, the quickest access to the next data block is by not having the tape stop (or even slow down) while the heads are crossing an interrecord gap. But even in this case for example, five milliseconds of access time may be needed for the heads to pass across the interrecord gap to the next block. The computer system in some cases remains idle during this time, or it utilizes complex programming to go to some other task during the interval.

Accordingly, the full-speed access time to the next block is directly proportional to the size of the interrecord gap (IRG). It is extremely difficult to maintain a minimum size interrecord gap under all operating conditions.

The problem is complicated by computer operating conditions which can require: (1) the tape to stop in the IRG after writing a block and to restart in order to write the next block, or (2) maintain full tape speed across the IRG, or (3) to have the tape slow down in the IRG before acelerating it to write the next block when the computer signals a new writing operation after having previously signaled it to stop.

In particular, the problem is made difficult in that, the next computer instruction to read or write a block can occur randomly with respect to the completion of the prior plock. Thus on the one hand, the computer may respond with a new read or write instruction almost immediately after the prior block is completed such as in microseconds; or on the other hand, the computer may not respond for a substantially long period of time such as many minutes or hours. However, with most computer programs, the computer responds with most new read or write instructions within about a millisecond after completion of the block. In most cases the computer can be made to respond without difficulty in less than one millisecond, since as explained above, one millisecond can be a long period of time in terms of computer operation.

Figure 7:
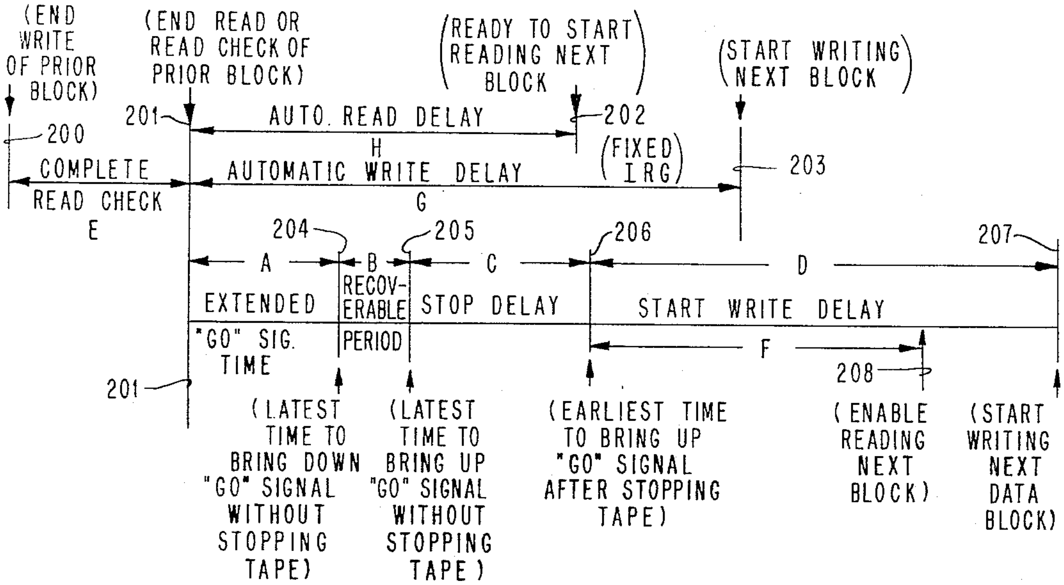
FIGURE 7 represents basic timing characteristics of the invention.
Figure 8:
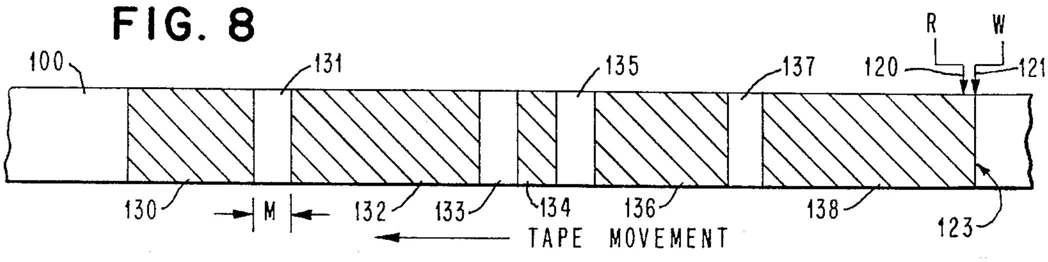
FIGURE 8 shows a tape having data blocks recorded thereon with interrecord gaps intervening among them.

FIGURE 7 shows basically how this invention operates with regard to when the reinstruct (next read or write instruction) occurs, and how the tape control signals must respond during a period of time after each block completion. The matter is further complicated by the tape drive generally having separate read-checking heads while its write heads are operating. In such case the writing of a record is not considered complete until its read checking has been completed. This can be seen in FIGURE 8 where read and write heads 120, 121 are operating with respect to tape. The arrows 120 and 121 figuratively each represent a plurality of parallel heads. In FIGURE 8, the write head has just reached the end 123 of block 132 and read-check heads 120 is still within the block, but will reach end 123 in an amount of time E. When reading tape, heads 120 only are used.

Thus in FIGURE 7, time instant 200 represents when write heads 121 reach block end 123, and time instant 201 represents when read heads 120 thereafter reach block end 123 while the tape is still moving at nominal speed. The time period E between instances 200 and 201 represents the time needed to complete the read check of a newly written block.

With the tape continuing to move at its nominal speed after completing a block, an interrecord gap (IRG) is generated in this invention by an automatic write delay G being timed out from the instant that the read head cleared the prior block and until a time 203, when writing begins for the next data block. Hence the automatic write delay exists during the IRG between times 201 and 203. It is a characteristic of this invention to automatically begin a write delay after each record is written on the theory that the next instruction will probably be another write instruction, because in practice it has been found that writing generally occurs with a rapid sequence of write instructions.

Thus the write delay automatically begins after completion of a prior data block without any knowledge of when the next write instruction will occur, or even that there will be another write instruction. But the automatic delay is provided only in the belief that there is a likelihood that there will be a next write instruction within a period of time defined as $A+B$ in FIGURE 7. If there is no write instruction over the period $A+B$ (starting at time 201 and ending at time 205), the tape is stopped for a stop delay period C (between times 205 and 206). A new write instruction received during period C cannot start tape until after the expiration of time C, when a start write delay D can begin at time 206 and continue until writing starts at time 207. When a new write instruction occurs after time 206, the start delay D will be begun by the instruction. The start write delay D is used whenever the tape is started from a stopped condition.

Figure 5:
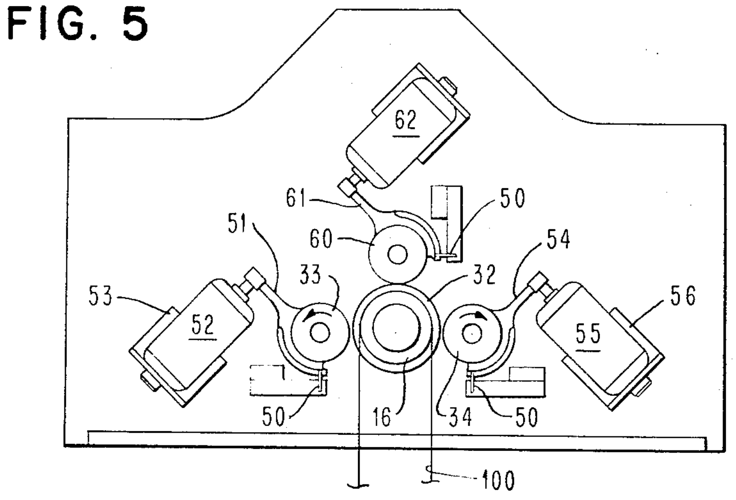
FIGURE 5 is an example of a capstan assembly on a tape drive which can be controlled by the invention.

The tap Go signal is controlled as represented in FIGURE 7. The Go signal is provided to actuate a capstan system such as shown in FIGURE 5, in which coils 52, 62 or 55 can be separately actuated to move any one of friction wheels 33, 60 or 34 against a friction disc 32 coupled to a capstan 16 about which tape 100 is wrapped; since wheels 33 and 34 rotate constantly in opposite directions, and wheel 60 is stopped according to which one of moving coils 52, 56 or 62 is actuated. This is explained in patent application Ser. No. 246,757, filed Dec. 24, 1962, now U.S. Patent No. 3,225,990, and owned by the same assignee as the present application.

Figure 2:
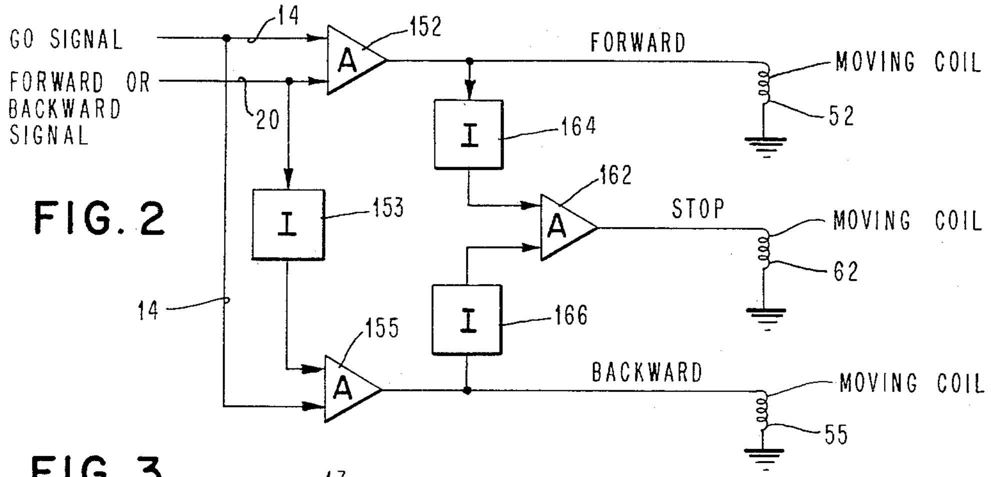

FIGURE 2 shows a circuit for actuating the moving coils 52, 62 or 55 to control tape movement. The Go signal is applied to lead 14 and is brought up whenever either forward or backward tape movement is required to thus activate either coil 52 or 55. When the Go signal is down, coil 62 is actuated by applying a brake to the tape, and neither coil 52 or 55 is actuated. A tape direction signal is applied to a lead 20 to determine whether coil 52 or 55 is actuated when a Go signal is applied. Thus an up condition for the signal on lead 20 signifies forward tape movement, and a down condition signifies backward tape movement.

An up condition on both leads 14 and 20 enables AND gate 152 to actuate coil 52. On the other hand, a down condition on lead 20 and an up condition on lead 14 enables only gate 155 because of inverter 153 in lead 20. When a down condition exists on both leads 14 and 20, both gates 152 and 155 are disabled which enables gate 162 (because of inverters 164 and 166) to actuate stop coil 62.

Figure 3:
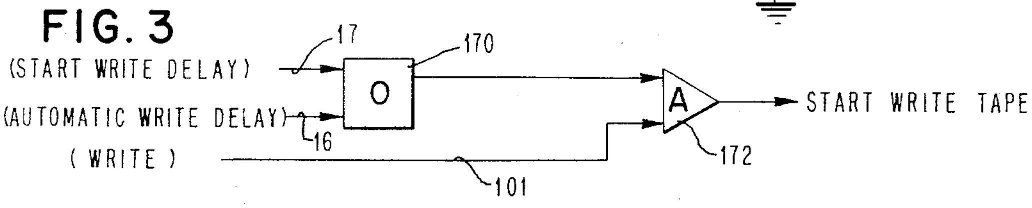

FIGURE 3 shows a circuit for controlling when writing starts at the end of a write delay. A write instruction from the computer brings up lead 101 to condition an AND gate 172, which remains disabled until its other input is brought up by the ending of a write delay. Either the ending of a start write delay signal on lead 17 or an automatic write delay signal on lead 16 provides an output from OR circuit 170 which enables gate 172 at the end of the delay period. The rise in signal output from gate 172 can set a write latch (not shown) to control writing on tape.

The tape movement operation for reading tape is similar to the operation for writing tape with one major exception, which is that tape reading does not necessarily start at the termination of the read delay. The expiration of the read delay only enables the reading function of the tape system. The read delay disables the tape read circuits while the head is passing over part of an IRG, so that noise is not then read. The read delay period must terminate before the read heads can reach the beginning of the next block. For this reason the read delay period is shorter than the write delay period.

Thus in FIGURE 7, an automatic read delay is started at time 201 in the same manner as an automatic write delay, but the read delay terminates sooner at time instant 202 and exists for period H. The period E is not involved during reading since only a single head is involved in any one track, and the next read instruction can be provided as soon as the read head clears the end of the block. The start read delay period F starts at time 206 with a read instruction given after time 205 during period C, but terminate at time 208 and is shorter than the start write delay period D.

Figure 6:
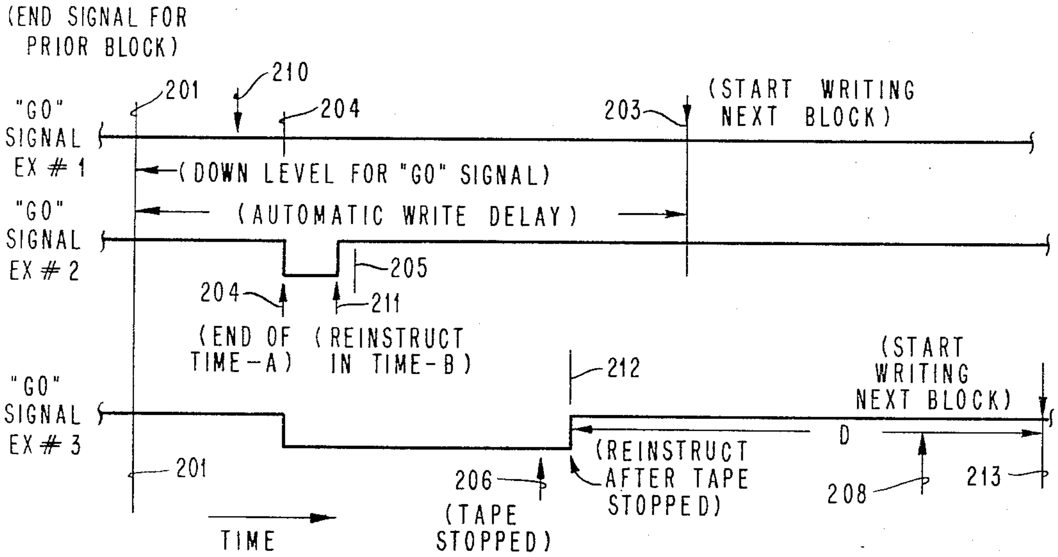
FIGURE 6 shows waveforms of operating examples of the invention.

FIGURE 6 illustrates examples of three different times when a write instruction may occur in relation to the completion of a prior block at time 201, when the read check is completed. The Go signal is maintained in an up condition both before and immediately after end of block time 201.

In Example #1, the next write instruction occurs at time 210 during period A, and this maintains the Go signal up and continues the timing out of the automatic write delay until writing of the next block starts at time 203.

In Example #2, the next write instruction occurs at time 211 during period B. The Go signal is automatically dropped at the end of time A because the next write instruction had not yet been received, but the Go signal is again brought up during period B by the instruction. Period B is short enough that the inertia of the mechanical capstan actuator is not significantly effected, nor is the tape speed significantly effected, by the Go signal being down for as much as period B.

Thus when an instruction during period B brings up the Go signal, the automatic write delay period G is uneffected and times out in the same manner as in Example #1, with the same size IRG resulting.

On the other hand, Example #3 in FIGURE 6 represents an instruction occurring at time 212 after the tape has stopped at time 206. As in the previous example, the Go signal drops at time 204, but here it cannot be brought up until after expiration of stop delay period C. Thus, the Go signal does not come up again until the next instruction time 212, and writing starts for the next block at time 213 after the tape has been accelerated to its nominal velocity at the expiration of a start write delay period D. If the instruction had occurred during C, the Go signal would have come up at time 206 and tape would have started writing at time 207.

The same basic examples shown in FIGURE 6 are applicable to a tape reading operation except that the read delay is shorter. Thus the continuous read delay is over at time 202 which enables reading to begin; but of course reading cannot begin util the read head reaches the tape block. The shorter read delay allows for a wide variation of tape speeds and for capstan start-stop characteristics. Also when the tape is started for example at time 212 in Example #3 of FIGURE 6, the read delay will be over at time 208, so that reading is enabled well ahead of the time that the read head reaches the next tape block.

Figure 1:
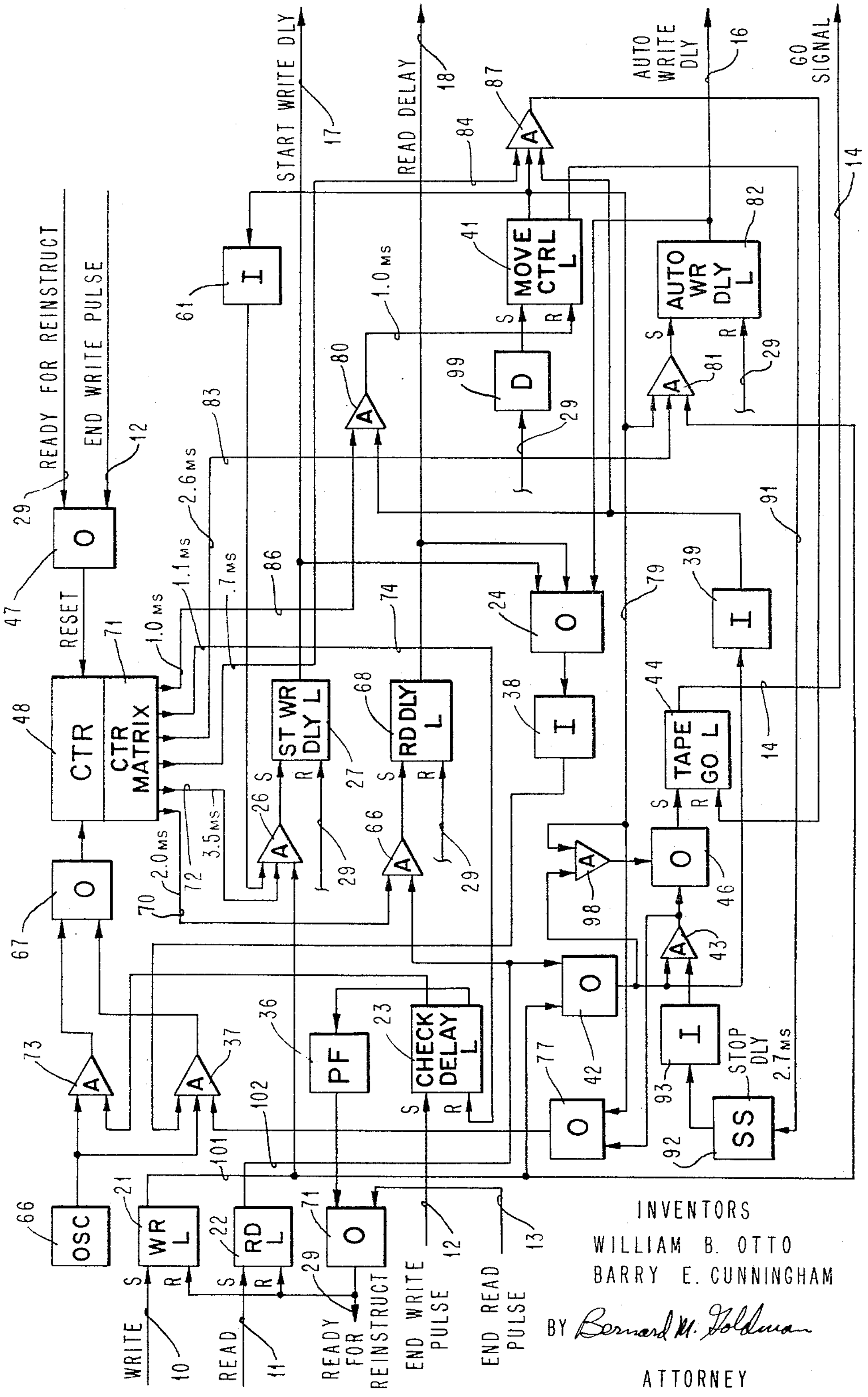
FIGURES 1, 2, 3 and 4 illustrate an embodiment of the invention.
Figure 4:
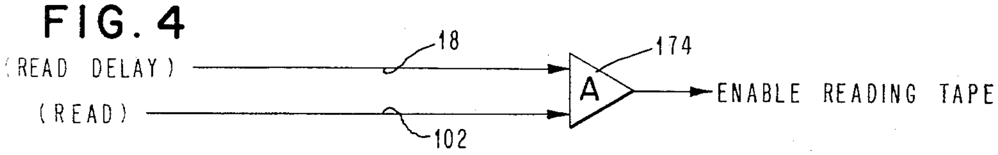

FIGURE 1 provides an embodiment of this invention represented by a circuit for controlling the Go signal while measuring the delay periods in the manner defined previously herein in regard to FIGURE 7. The output lines from the circuit in FIGURE 1 are: line 14 which provides the Go signal to the circuit of FIGURE 2, and lines 16, 17 and 18 which provide the respective write and read delays to the circuit of FIGURES 3 and 4.

A write instruction is provided from a computer system to the circuit of FIGURE 1 as a pulse on input line 10. Similarly a read instruction from the computer is provided as a pulse on input line 11. The end-of-writing a tape data block is provided in response to the computer stopping transfer of data; and this is signaled by a pulse on an input line 12, occurring when the write head has reached the end of a block; such as when write head 121 reaches block end 123 in FIGURE 8. Analogously, a tape read operation is indicated as terminated by a pulse on line 13; and this occurs when read head 120 reaches block end 123 during a read only operation.

A write latch 21 is set by a write instruction pulse, and a read latch 22 is set by a read instruction pulse. A check delay latch 21 is set by an end write pulse on lead 12. The purpose of latch 23 is to signal the beginning of period E shown in FIGURE 7, during which the read head completes checking a tape block which has just been written. Latch 23 is reset at the end of period E when the read checking head has cleared block end 123 of FIGURE 8, by the timing out of a clock period by a counter 48.

When tape is in a stopped condition, such as prior to writing or reading the first block on tape, and a write instruction is given, latch 21 is set. It then provides an output to an AND gate 26 (then blocked), and to an OR circuit 42. The resulting output of OR circuit 42 passes through an AND gate 43 and an OR circuit 46 to set a tape Go latch 44, that brings up the Go signal on line 14 (which goes to FIGURE 2). Also the signal from gate 43 passes through an OR circuit 77 to enable an AND gate 37, which begins passing pulses from a free-running oscillator 66 to an OR circuit 67 to drive counter 48, which previously was in a rest state. The input to gate 37 from an inverter 38 is conditioned since no input is then provided to an OR circuit 24.

The output on line 17 remains down for the start delay period that began by setting tape go latch 44.

At the end of the start write delay period (such as 3.5 milliseconds), an output from a counter AND gate matrix 71 comes up on lead 72 to enable AND gate 26 and set latch 27, which terminates the write delay by bringing up an output on lead 17. It passes through OR circuit 170 and AND gate 172 in FIGURE 3 to enable the start of writing on tape. Also setting latch 27 conditions OR circuit 24, that has its output inverted by circuit 38 to disable gate 37 and stop oscillator pulses to the counter.

Immediately after the writing of the data block is completed, an end write puse is provided on lead 12. It rests counter 48 through an OR circuit 47, and sets check delay latch 23. Then an output of latch 23 enables an AND gate 73 to pass oscillator pulses through circuit 67 to drive counter 48. When counter 48 times out period E, an output is brought up on a line 74 from the counter matrix to reset latch 23 and end period E. When reset, latch 23 disables gate 73 and terminates the counter operation.

Also the reset of latch 23 causes a pulse to be generated by a pulse former 36 which provides a pulse through an OR circuit 71 to head 29 that signals the computer system for the next instruction, and also resets counter 48 through OR circuit 47. Also at the end of period E, the pulse on lead 29 resets read and write latches 21 and 22 to complete the prior instruction and make them ready for the next instruction. Further, this pulse on lead 29 resets read and write delay latches 68, 27 and 82 to assume disablement of gates 172 and 174 in FIGURES 3 and 4 to prevent all read and write functions.

Still further, the pulse on lead 29 passes through a few microsecond delay 99 to set a move control latch 41 and thereby begins the period A defined previously. The output of latch 41 beigns period A by passing an output through OR circuit 77, which thereby enables gate 37 to pass oscillator pulses to the counter to begin the timing for period A.

Go latch 44 had been set prior to writing the prior block as explained previously and it was not reset. Thus latch 44 is set throughout period E and tape movement continues at nominal speed. The reset input of latch 44 is connected to the output of AND gate 87, which is not affected during period E, since gate 87 was blocked by an inverter 39 receiving the set output of write latch 21 during period E. Delay 99 assures that counter 48 is reset before latch 41 is set so that no output from gate 87 can then occur to reset Go latch 44.

If an instruction occurs during period A, latch 21 or 22 is set and provides an output from OR circuit 42. It is inverted by inverter 39 to block gate 87 and an AND gate 80, which thereby block the reset of Go latch 44 and move control latch 41 which otherwise would respectively occur at the ends of period A (0.7 ms.) and period B (1.0 ms.).

Thus if an instruction is received during periods A or B, an automatic write delay period is continued until an AND gate 81 is enabled to set latch 82 at a counter output (at 2.6 ms.) on lead 83, while being conditioned by the write latch output on lead 101 and the move control latch output on lead 79. The set output of latch 82 conditions OR circuit 24 and inverter 38 to block gate 37 and terminate the automatic delay period G, which started at the beginning of period A.

If no instruction occurs during period A, the signal on lead 84 is brought up at the end of period A (for example 0.7 millisecond counter line) and passes through gate 87 to reset Go latch 44 and drop the Go signal on lead 14. This begins period B.

If an instruction occurs during period B, it passes from latch 21 or 22 through OR circuit 42 and an AND gate 98 (then conditioned by latch 41) to set the Go latch 44 and bring up the signal on Go line 14.

If no new instruction occurs during period B, a signal is brought up at the end of period B (1.0 ms. of counter time) on lead 86 from the counter matrix and passes through AND gate 80 to reset move control latch 41. This deconditions OR circuit 77 to disable gate 37 and stop counter 48; this terminates the automatic delay. The other input to gate 80 was conditioned by a no read or no write instruction signal from an inverter 39. Thus an instruction during period B causes inverter 39 to block gate 80; and latch 41 cannot then be reset at the end of period B. This continues the automatic read or write delay until latch 68 or 82 is set.

The resetting of move circuit control latch 41 begins the stop delay period C defined previously by actuating a single shot 92 for period C (for example 2.7 milliseconds). The output of single shot 92 is provided through inverter 93 which thereby block AND gate 43 to prevent a new instruction from setting Go latch 44 during period C. Also during this period, AND gate 98 is blocked by the reset condition of the move control latch 41. Thus no instruction during stop delay period C can actuate Go latch 44, so that the Go signal must remain down for the stop delay period.

An instruction during period C will set latch 21 or 22. After the expiration of the period C output from single shot 92, the instruction is passed through gate 43 to set Go latch 44. If it is a write instruction, a start write delay begins and is executed in the manner previously explained. If it is a read instruction, gate 37 begins the counter operation in the same manner as a write instruction, but at the end of the read delay, an output on lead 70 (at 2.0 ms.) passes through AND gate 66 to set latch 68 an enable gate 174 in FIGURE 4, which also receives the read instruction signal from latch 22 to permit tape reading to begin.

The same procedure occurs for an instruction received after the end of period C, since it can immediately pass through gate 43 to set Go latch 44.

When and if a next instruction occurs, and what type it will be are functions of the computer program operation. Accordingly, when the magnetic tape system has completed execution of an instruction, it has no specific knowledge about the next instruction, and this invention utilizes a statistical knowledge that there is a likelihood that a similar instruction will occur within the following periods A or B.

Programs for computer operation can generally be designed to cause most of the next instructions to occur within about a millisecond after the tape drive is ready for a new instruction. This would require that the sum of the A and B periods be at least one millisecond.

To generate fixed minimum size interrecord gaps while maintaining nominal tape velocity, the maximum value for the sum of the A and B periods is the automatic write delay period (which might be 2.6 milliseconds). However, if it is ever necessary to stop tape movement while generating an IRG, it will be made greater than the minimum size by the amount of tape movement at nominal velocity over periods A plus B. Using these characteristics the designer can most easily vary period A. However, if it is necessary to stop tape while generating an IRG, the IRG can nevertheless be maintained constant (at the expense of increasing access time) by doing a backhitch operation of the type described in U.S. patent application Ser. No. 246,813, filed Dec. 24, 1962, now U.S. Patent No. 3,274,574, and owned by the same assignee as the present application.

When reading tape while maintaining nominal velocity, the maximum value of periods A and B must consider operation with a minimum size IRG, and therefore should generally not be greater than the automatic read delay period. However, it may exceed the read delay period but not the write delay period if combined with the backhitch operation explained in the previously cited United States patent application.

When using a capstan arrangement as shown in FIGURE 5, it is desirable to bring the tape to a halt before permitting it to be started again if the B period has terminated without a new instruction. In such case the momentum of the coil and actuator arm for wheel 33 or 34 has risen to the point that the Go signal cannot be brought up thereafter without the wheel 33 or 34 having lost contact with disc 32 and the tape slowing down as a result, and movement started toward disc 32 by stop wheel 60. If the Go signal is permitted to be brought up with a new instruction after the B period when the tape is slowing down (by the causing termination of the stop delay) and using the start write delay, the IRG will be longer than the minimum size and will be variable according to when within the tape slow down that the next write instruction occurred. This is permissible under some conditions since write access time is less.

Whenever writing without utilizing simultaneous operation by read check heads, the check latch 23, gate 73, and the E period may be eliminated from the above described embodiment, with it then responding to the end write pulse on lead 12 in the same manner as it responds to an end read pulse on lead 13.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Means for controlling a tape write or read operation comprising:
   - means for actuating a read or write delay automatically in response to the end of each tape block,
   - means for measuring a time interval not greater than said read or write delay from the beginning of said read or write delay, and
   - means for terminating said automatic write delay if a next read or write instruction does not occur within said time interval.

2. Tape control means as defined in claim 1 further comprising:
   - means for actuating a stop delay in response to a next read or write instruction not occurring during said time interval.

3. Tape control means as defined in claim 1 in which said time interval is divided into two periods by indications from said time interval measuring means comprising:
   - means for providing a capstan actuation signal during a first of said two periods,
   - means for terminating said capstan actuation signal at the beginning of said second period,
   - and means for again energizing said capstan actuation signal by a read or write instruction during said second period.

4. Tape control means as defined in claim 3 further including means for actuating a stop delay in response to the termination of said second period without a read or write instruction.

5. Tape control means as defined in claim 4 further comprising:
   - means for providing a start delay,
   - and means for enabling the initiation of said start delay with an instruction after termination of said stop delay.

6. Tape control means as defined in claim 5 in which each instruction is a write instruction.

7. Tape control means as defined in claim 5 in which said instruction is a read instruction.

8. Means for controlling a tape write or read operation comprising:

a move control latch being set in response to the end of each tape data block, time measuring means being actuated by said move control latch and providing time indications at the end of measured periods, a delay latch being controlled by the setting of said move control latch, and means for controlling the delay latch by the first of (a) actuating said move control latch or (b) the end of a delay period provided by an indication from said time measuring means.

9. Means as defined in claim 8 in which said time measuring means is an oscillator driven clock.

10. Tape control means as defined in claim 8 further comprising, a tape go latch set by a read or write instruction, means for indicating a division of said shorter measured period indication into two periods, means for resetting said tape go latch in response to an indication of the expiriation of a first of said two periods without an instruction, and means for setting said tape go latch during a second of said two periods in response to an instruction.

References Cited

UNITED STATES PATENTS

| | | | |
|---|---|---|---|
| 2,975,407 | 3/1961 | O'Brien ---------- | 340—174.1 |
| 3,136,465 | 6/1964 | Comstock -------- | 340—174.1 |

BERNARD KONICK, *Primary Examiner.*

A. I. NEUSTADT, *Assistant Examiner.*